United States Patent
Plett et al.

(10) Patent No.: US 11,910,917 B2
(45) Date of Patent: Feb. 27, 2024

(54) STORAGE SYSTEM WITH MOVABLE PLATFORMS AND INTERNAL ELECTRICAL POWER DISTRIBUTION SYSTEM

(71) Applicant: VIDIR SOLUTIONS INC., Arborg (CA)

(72) Inventors: Delmer Plett, Arborg (CA); Dimitri Warlet Caldeira, Arborg (CA); Umair Younas, Arborg (CA); Terina Kunjumon, Arborg (CA)

(73) Assignee: Vidir Solutions Inc., Arborg (CA)

( * ) Notice: Subject to any disclaimer, the term of this patent is extended or adjusted under 35 U.S.C. 154(b) by 83 days.

(21) Appl. No.: 17/837,510

(22) Filed: Jun. 10, 2022

(65) Prior Publication Data
US 2023/0148748 A1 May 18, 2023

Related U.S. Application Data

(60) Provisional application No. 63/278,820, filed on Nov. 12, 2021.

(51) Int. Cl.
*A47B 49/00* (2006.01)
*H02B 1/20* (2006.01)

(52) U.S. Cl.
CPC ............. *A47B 49/002* (2013.01); *H02B 1/20* (2013.01)

(58) Field of Classification Search
CPC ..... A47B 49/002; A47B 49/008; A47B 49/00; H02B 1/20; A47F 3/08; A47F 3/11; H02J 7/0044; B65G 1/127

USPC ................... 211/1.52, 1.55, 78, 164; 108/20; 320/115
See application file for complete search history.

(56) References Cited

U.S. PATENT DOCUMENTS

| | | | | |
|---|---|---|---|---|
| 253,290 A | * | 2/1882 | Hunter | A47F 5/03 211/164 |
| 557,948 A | * | 4/1896 | Bever | A47F 3/10 211/1.55 |
| 581,049 A | * | 4/1897 | Unkenholz | A47F 3/08 211/121 |
| 682,517 A | * | 9/1901 | Bahnemann | A47F 3/08 211/121 |
| 704,157 A | * | 7/1902 | White | A47F 3/08 211/121 |
| 1,552,290 A | * | 9/1925 | Fowler | A47F 5/03 211/164 |

(Continued)

*Primary Examiner* — Jennifer E. Novosad
(74) *Attorney, Agent, or Firm* — Christopher J. Dynowski; Ryan W. Dupuis; Ade & Company Inc.

(57) ABSTRACT

A storage system with platforms for storing items, which are movable along a prescribed path, features an internal electrical power distribution system for supplying electrical power at each of the movable platforms to operate electrical devices, such as refrigerators or chargers. The power distribution system comprises a set of distribution terminals electrically connected to an external electrical power source, such as mains power, which extend along respective paths which follow the prescribed path of movement of the platforms. Further, the distribution system comprises a plurality of electrical bridging assemblies respectively bridging between the platforms and the distribution terminals. The electrical bridging assemblies are mechanically connected in fixed relation to the platforms and connected in movable electrical contact with the distribution terminals.

11 Claims, 4 Drawing Sheets

(56) References Cited

U.S. PATENT DOCUMENTS

| | | | | |
|---|---|---|---|---|
| 1,643,224 A * | 9/1927 | Shelton | A47F 3/08 | 211/121 |
| 1,787,898 A * | 1/1931 | Fuller | A47F 3/08 | 211/121 |
| 1,887,245 A * | 11/1932 | Murray | E04H 6/14 | 414/251 |
| 1,974,272 A * | 9/1934 | Heineman | A47F 3/08 | 40/493 |
| 2,030,741 A * | 2/1936 | Bodine | A47F 3/08 | 211/121 |
| 2,442,070 A * | 5/1948 | Bouchard | A47F 3/08 | 211/121 |
| 2,592,038 A * | 4/1952 | Kimsey | A47F 3/08 | 62/250 |
| 2,875,014 A * | 2/1959 | Moore | A47F 3/08 | 312/267 |
| 2,984,530 A * | 5/1961 | Carlton | A47F 3/08 | 312/97 |
| 3,861,519 A * | 1/1975 | Ware | A47B 63/067 | 211/121 |
| 4,303,283 A * | 12/1981 | Mueller | A47F 3/08 | 312/305 |
| 5,039,180 A * | 8/1991 | Lemons | A47B 81/068 | 312/267 |
| 5,040,689 A * | 8/1991 | Hull | A47B 49/008 | 211/121 |
| 5,161,929 A * | 11/1992 | Lichti, Sr. | B65G 1/1371 | 198/794 |
| 5,186,337 A * | 2/1993 | Foster | A61G 12/004 | 211/168 |
| 5,348,485 A * | 9/1994 | Briechle | H01R 25/14 | 439/121 |
| 5,425,648 A * | 6/1995 | Farham | H01R 25/16 | 439/116 |
| 5,809,874 A * | 9/1998 | Kim | A47B 49/002 | 211/164 |
| 5,924,580 A * | 7/1999 | Chase | A61G 13/0027 | 211/1.55 |
| 6,218,796 B1 * | 4/2001 | Kozlowski | H02J 7/0013 | 62/239 |
| 7,130,190 B1 * | 10/2006 | Baker | H02J 7/0031 | 280/47.35 |
| 7,743,930 B2 * | 6/2010 | Krohn | A47F 3/11 | 211/1.51 |
| 7,800,914 B2 * | 9/2010 | Dully | A61B 50/13 | 361/756 |
| 7,811,042 B1 * | 10/2010 | Menendez | B65G 1/127 | 211/1.55 |
| 7,878,341 B2 * | 2/2011 | Ming | B25H 3/025 | 211/164 |
| 8,733,860 B1 * | 5/2014 | Burke | B65G 1/127 | 312/134 |
| 9,357,858 B2 * | 6/2016 | Sun | A47F 3/001 | |
| 10,084,327 B2 * | 9/2018 | Roberts | H02J 7/0013 | |
| 10,135,268 B1 * | 11/2018 | Gokcebay | H02J 7/0013 | |
| 10,432,001 B1 * | 10/2019 | Bellis | A47B 57/045 | |
| 11,064,628 B2 * | 7/2021 | Thibaut | H05K 7/20772 | |
| 2010/0176762 A1 * | 7/2010 | Daymude | H02J 7/0044 | 320/110 |
| 2011/0121776 A1 * | 5/2011 | Lev | G06F 1/26 | 361/679.55 |
| 2014/0062390 A1 * | 3/2014 | Webber | H02J 7/0013 | 320/107 |
| 2016/0020625 A1 * | 1/2016 | Tsou | H02J 7/0044 | 320/115 |
| 2023/0148748 A1 * | 5/2023 | Plett | A47B 49/008 | 211/1.52 |

\* cited by examiner

STORAGE SYSTEM WITH MOVABLE PLATFORMS AND INTERNAL ELECTRICAL POWER DISTRIBUTION SYSTEM

This application claims the benefit under 35 U.S.C. 119(e) of U.S. Provisional Application Ser. No. 63/278,820 filed Nov. 12, 2021.

FIELD OF THE INVENTION

The present inventions relates generally to a storage system which has movable platforms for storing items, and more particularly to such a system with an internal electrical power distribution system for providing electrical power for electrical devices carried on the movable platforms.

BACKGROUND

The Applicant manufactures a number of storage system products which are particularly suited to maximize vertical storage space and to minimize footprint. Such systems employ movable shelves or platforms which circulate, such as on a carousel, around a prescribed path within a frame of the storage system. It may be desirable to supply electrical power to the storage shelves or platforms of such a system to increase flexibility of the types of items which can be stored.

SUMMARY OF THE INVENTION

According to an aspect of the invention there is provided a storage system for storing items and carrying electrical devices comprising:

a frame arranged for resting on a support surface and defining a storage space and an access opening therefor;

a plurality of platforms supported within the storage space for movement relative to the access opening and along a prescribed path, for receiving the items to be stored and selectively presented at the access opening;

a drive assembly configured to move the platforms along the prescribed path; and an electrical power distribution system for providing electrical power for the electrical devices on the platforms, wherein the electrical power distribution system comprises:

a set of distribution terminals arranged for electrical connection to an electrical power source and extending along respective paths which follow the prescribed path of movement of the platforms; and a plurality of electrical bridging assemblies connected for movement along the set of distribution terminals and respectively mechanically connected in fixed relation to the platforms, wherein the electrical bridging assemblies have respective first electrical terminals electrically connected to the distribution terminals and respective second electrical terminals located at or adjacent the platforms and configured to supply the electrical power from the electrical power source to the electrical loads on the platforms.

In one arrangement, the prescribed path of movement of the platforms is loop-shaped and the set of distribution terminals are loop-shaped so as to follow loop-shaped paths.

In one such arrangement, the loop-shaped distribution terminals are disposed side-by-side so as to be respectively concentric to the prescribed path of movement of the platforms.

In one arrangement, the loop-shaped distribution terminals encompass a loop-shaped member defining the prescribed path of movement so as to be located outwardly thereof.

In one arrangement, the distribution terminals comprise electrically-conductive channels.

In one arrangement, the distribution terminals comprise electrical conductors which span the respective paths of the distribution terminals.

In one arrangement, when the platforms are respectively mounted to a carrier arranged to move along the prescribed path and when the prescribed path has at least one turn, the electrical bridging assemblies comprise slip rings mounted to the carrier and forming the respective second terminals. Thus the respective platform can pivot relative to the set of distribution terminals without losing electrical contact therewith.

In one such arrangement, the electrical power distribution system further includes electrical outlets mounted to the platforms and configured to receive electrical plugs, and the electrical bridging assemblies further include electrical wires with first ends electrically connected to terminals of the slip rings and second ends electrically connected to the electrical outlets on the platforms.

In one such arrangement, the electrical bridging assemblies comprise electromechanical assemblies forming the respective first terminals, wherein the electromechanical assemblies are configured for movable electrical contact with the set of distribution terminals and are electrically connected to the slip rings to transfer electrical power thereto.

In one arrangement, the electrical power distribution system comprises power electronic converters respectively supported on the platforms and electrically connected downstream from the electrical bridging assemblies. The power electronic converters are configured to transform the power from the source to a format usable by the electrical devices on the platforms.

Typically, the electrical power source is external.

Typically, the electrical power source is mains electrical power.

Also, the drive assembly is usually also electrically connected to the electrical power source.

BRIEF DESCRIPTION OF THE DRAWINGS

The invention will now be described in conjunction with the accompanying drawings in which.

In the drawings like characters of reference indicate corresponding parts in the different figures.

DETAILED DESCRIPTION

The accompanying figures show a storage system 10 for storing items and carrying electrical devices. The storage system 10 comprises movable shelves or platforms 12 configured to receive and support the storage items and the electrical devices, which are circulated along a prescribed path 14 so the platforms are selectively locatable at an access opening 15 of the system 10 for retrieval of the items stored thereon. In the illustrated arrangement, the storage system 10 is a vertical type storage system where the prescribed path 14 lies in an upstanding plane, which minimizes a footprint of the system 10 on an underlying support surface SS.

Figure 1:
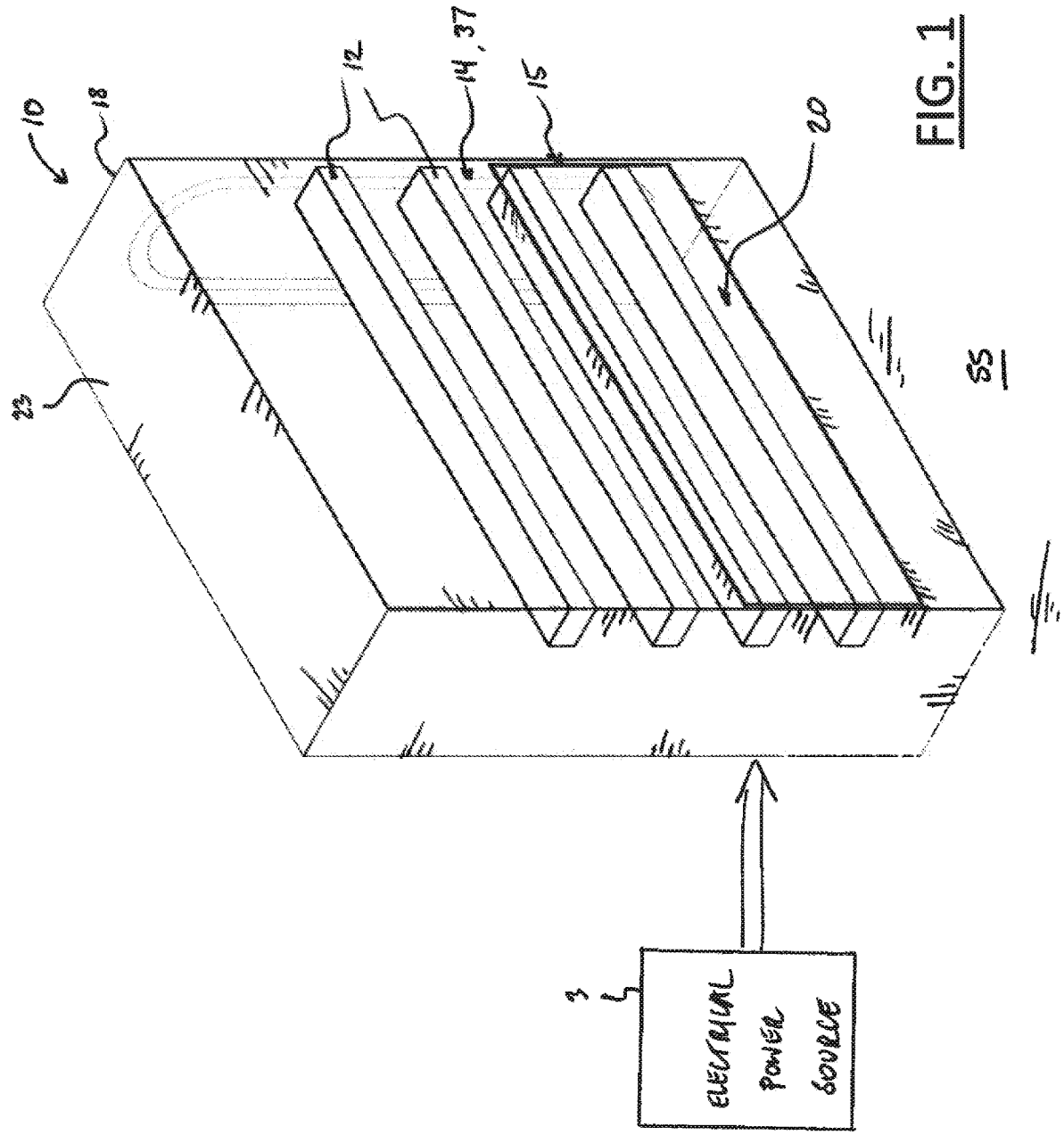
FIG. 1 schematically illustrates a perspective view of an arrangement of storage system according to the present invention, showing some components which otherwise would not be visible.
Figure 2:
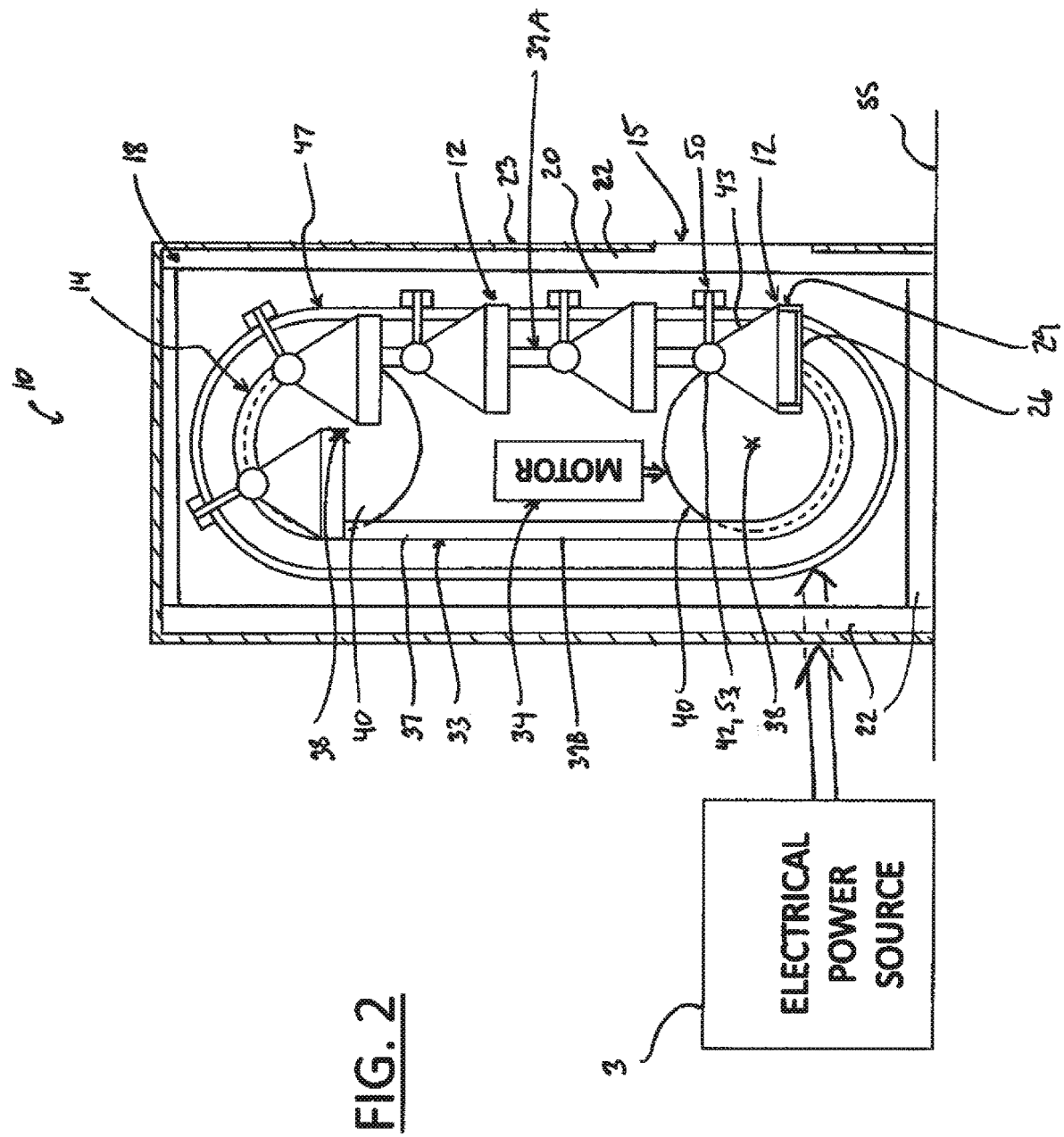
FIG. 2 schematically illustrates a cross-sectional view of the arrangement of FIG. 1.

Generally speaking, and referring to FIGS. 1 and 2, the storage system 10 comprises a frame 18 arranged for resting on the support surface SS, such as a floor, and which defines an internal storage space 20 within a periphery of the frame and the access opening 15 for the storage space.

Typically, the frame 18 comprises a framework of vertical and horizontal beams 22 interconnected to define an uninterrupted interior storage space 20 centrally within the frame 18. The frame 18 is covered by panels 23 spanning between adjacent pairs of beams of the framework to enclose the storage space, except for at the access opening 15. The frame 18 and covering panels 23 therefore collectively form a housing containing the platforms 12 and other components of the storage system 10.

Figure 3:
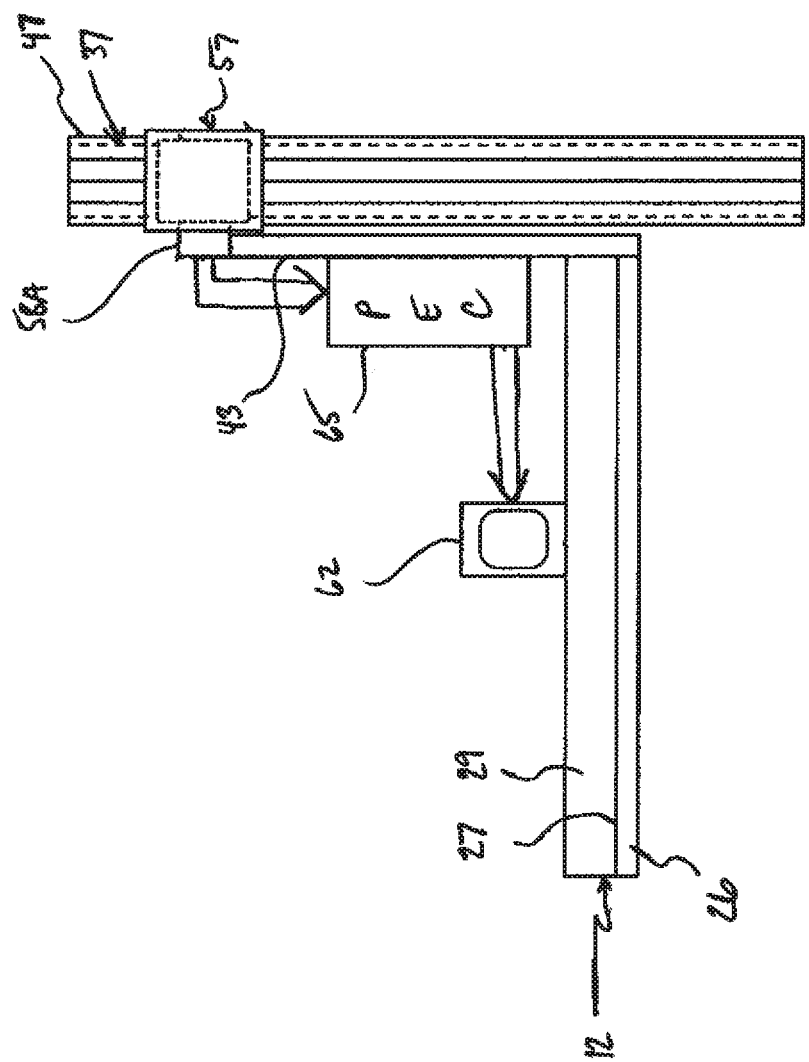
FIG. 3 schematically illustrates a sectional view showing a portion of an electrical power distribution system and a platform of the arrangement of FIG. 1.

As mentioned, the storage system 10 also comprises a plurality of shelves or platforms 12 supported within the storage space 20 for movement relative to the access opening 15 and along a prescribed predetermined path 14 within the frame 18. Referring to FIGS. 2 and 3, each platform 12 comprises a base or floor member 26 which is substantially horizontally oriented and defines an upwardly facing support surface 27 for carrying items or articles to be stored, as well as other equipment, for example electrical devices such as refrigerators or lighting configured to illuminate an individual storage space over the support surface 27 of a respective one of the platforms. Preferably, as in the illustrated arrangement, each platform or shelf 12 also includes a peripheral wall 29 standing upwardly from the floor 26.

To move the platforms 12 along the prescribed path 14, the system 10 includes a drive assembly configured therefor. In the illustrated arrangement, the drive assembly comprises a carousel 33 arranged to rotate in a vertically upstanding plane and a motor 34 operatively connected thereto to rotate the carousel. The carousel 33 comprises a tensioned loop-shaped member 37 encircling one or more spaced rotational axes 38 and following the prescribed path 14. In the illustrated arrangement, the carousel 33 is elliptical with opposite parallel linear runs 39A, 39B and rotates around a pair of rotational axes, one of which is arranged above the other one of the pair. The loop-shaped member 37 is for example an endless chain entrained on sprockets 40 respectively defining the rotational axes 38. The motor 34 is operatively coupled to at least one of the sprockets 40, in this case indicated by an arrow in FIG. 3, to drive rotation of the loop-shaped member 37. The drive assembly, and more specifically the motor 34 thereof, is arranged for electrical connection to, so as to be powered by, an electrical power source 3 distinct from the drive assembly. Typically, as in the illustrated arrangement, the power source 3 is mains power which is distributed through a building or structure in which the storage system 10 is used. The mains power 3 therefore is an external power source to the storage system 10.

It therefore will be appreciated that the loop-shaped member 37 defines the prescribed path 14 followed by the movable platforms 12. Since the member 37 is driven for rotation and the platforms are coupled in fixed relation thereto so as to move with the member 37, the member 37 serves as a carrier for translating the platforms 12.

Since the carousel 33 is generally vertical, the platforms 12 are respectively mechanically connected to the loop-shaped member 37 with pivotal joints 42 so that each platform 12 moves in fixed relation to a prescribed point on the loop-shaped member, defined by the joint 42, but is able to pivot relative to the member 37 upon transition from one runs such as 39A of the carousel to the other such as 39B. Furthermore, each platform 12 is suspended from its corresponding mounting joint 42 such that gravity acts to maintain the platform horizontal even upon transition between carousel runs. An end wall portion 43 of the peripheral wall 29 is connected to pivotal joint 42 to locate the floor 26 below same.

Each platform 12 is operatively connected at a respective end thereof, defined by end wall portion 43, to the carousel 33 disposed on an interior side of an upstanding wall of the housing of the storage system 10, and is also usually supported at an opposite end of the platform by a distinct complementary support member (not shown) from carrier 37 that is arranged, by positioning and being shaped, to mirror the prescribed path 14. The complementary support member may be a stationary track or a driven loop-shaped member like that at 37, rotationally supported by sprockets respectively arranged at the rotational axes 38 and driven by the motor 34.

In order to deliver electrical power to the movable platforms 12, for example for refrigeration or electrical charging of items received thereon, the system 10 includes an internal electrical power distribution system. The power distribution system comprises a set of distribution terminals 47 arranged for electrical connection to the electrical power source 3 and extending along respective paths which follow the prescribed path 14 of movement of the platforms 12. In such a manner, regardless of position of a respective one of the platforms 12 along the prescribed path 14, there is provided a corresponding location on one or more of the distribution terminals registered with the position of the platform 12 on the path 14, from which power can be drawn for electrical devices on the platform. The distribution terminals 47 are electrically connected to the external electrical power source 3 with or without any intervening power-altering or modifying component such as a transformer. In the illustrated arrangement, there is no intervening power-altering or modifying component.

Furthermore, the power distribution system comprises a plurality of electrical bridging assemblies 50 connected for movement along the set of distribution terminals 47 and respectively mechanically connected in fixed relation to the platforms 12. The electrical bridging assemblies 50 comprise respective first electrical terminals 51 electrically connected to the distribution terminals 47 and respective second electrical terminals 53 located at or adjacent the platforms 12 and configured to supply electrical power for the electrical loads thereon. The distribution terminals are stationary relative to the frame 18 of the storage system 10.

Since the prescribed path is loop-shaped, the distribution terminals 47, too, are loop-shaped, so as to follow loop-shaped paths. More specifically, the terminals are endless and elliptical-shaped with opposite parallel linear portions interconnected by a pair of semicircular arcuate portions. The distribution terminals 47 are arranged to be coplanar with the prescribed path and is equidistant thereto across the full perimeter of the path.

The loop-shaped distribution terminals 47 encompass the loop-shaped member 37 defining the prescribed path 14 of platform movement within the storage space 20 so as to be located outwardly of the carousel member 37. Thus, any electrical connection to the distribution terminals 47 extends outwardly from the loop-shaped member 37 of the drive assembly, which in the illustrated arrangement delimits the periphery of the drive assembly such that remaining components thereof are contained within same, so as not to interfere with the drive assembly. Furthermore, the distribution terminals 47 are disposed side-by-side so as to be respectively concentric to the prescribed path 14 of movement of the platforms 12. As such, electrical connections spanning between the distribution terminals 47 and the loop-shaped carrier 37 do not interfere with one another.

The distribution terminals 47 of the illustrated arrangement comprise electrical conductors which span the respective paths of the distribution terminals 47. As such, when the terminals 47 are loop-shaped, the conductors are endless. Thus, power can be drawn uninterruptedly across the full length of the terminals.

In the illustrated arrangement, the terminals 47 comprise electrically-conductive channels of a metallic material such as copper. The conductive channels are U-shaped so as to have a base wall and a pair of opposite sidewalls upstanding to the base wall. Interiors of the channels are exposed for electrical contact but exteriors thereof are covered with electrical insulation to prevent short-circuiting. The channel-shape of the terminals 47 forms a track along which an electromechanical assembly configured for movable electrical contact can move therealong, following movement of the respective platform 12 along the prescribed path 14.

Turning initially to a perspective from the carrier 37 where physical translation of the platforms originates, since the paths as travelled by the platforms 12 and as followed by the distribution terminals 47 are loop-shaped so as to have turns or curves in the prescribed path, the electrical bridging assemblies 50 for transferring power from the terminals 47 to the platforms 12 for connection of electrical devices thereon comprise slip rings mounted to the carrier. The slip rings form the second electrical terminals of the bridging assemblies 50 and are therefore indicated at 53. The slip rings are mounted to the loop-shaped carrier 37 so as to circulate around the one or more rotational axes 38.

Figure 4:
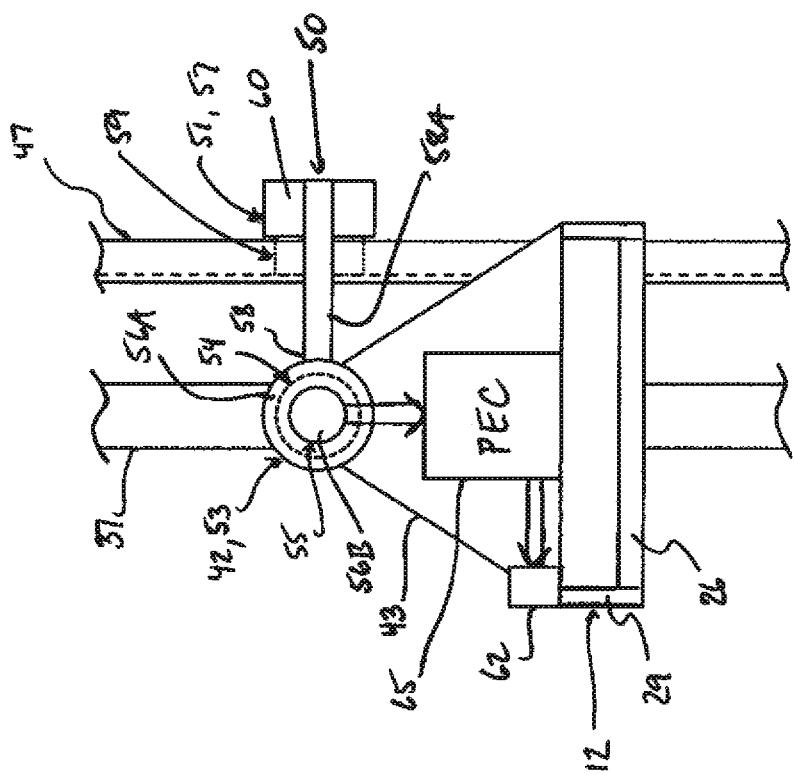
FIG. 4 is an enlarged cross-sectional view like FIG. 2 showing the elements in FIG. 3.

Referring to FIG. 4, the slip rings 53 are of a conventional design and comprise outer electrical terminals 54 which are rotatably supported, typically mechanically, around inner electrical terminals 55 electrically connected thereto such that electrical power can be transferred therebetween. Each slip ring 53 comprises an outer rotational body 56A mechanically connected in fixed relation to the carrier 37 and supporting the outer electrical terminals 54, which are annular, and a rotational inner body 56B, rotationally coaxially connected to the outer body 56A and mechanically connected in fixed relation to the platform 12 and supporting the inner electrical terminals 55 which is annular.

To electrically interconnect the slip rings and the electrical distribution terminals 47, the electrical bridging assemblies 50 further comprise electromechanical assemblies forming the respective first electrical terminals of the bridges 50 and configured for movable electrical contact with the distribution terminals 47. The electromechanical assemblies, which follow the slip rings 53 in regard to physical or movement, define the first electrical terminals of the electrical bridges 50 and therefore are indicated at 51. The electromechanical assemblies 51 follow driven movement of the slip rings 53 and can therefore be referred to as followers in relation to the carrier 37.

The electromechanical assemblies 51 have respective first members 57 in sliding electrical contact with the set of distribution terminals 47 and respective second members 58 in rotational electrical contact with respective terminals of the slip rings, which in the illustrated arranged are the outer terminals 54.

More specifically, the sliders 57 each carry electrical contacts 59 configured for insertion into the conductive channels of the terminals 47 and a base 60 external to the conductive channels on which the contacts 59 are supported. The electrical contacts 59 are mechanically biased into electrical contact with the distribution terminals 47.

The second members 58 comprise conduits 58A spanning between the distribution terminals 47 and the carrier 37 and carrying electrical wires there, which electrically interconnect the electrical contacts 59 of the sliders 57 and the corresponding terminals, in this case at 54, of the slip rings 53. The conduits 58A are respectively mechanically connected at first ends to the bases 60 of the sliders 57 and at opposite ends to the outer bodies 56A of the slips rings 53. Thus, the conduits 58A of the second members act as physical bridges between the set of distribution terminals 47 and the carrier 37 to shield electrical wiring spanning therebetween from physical or mechanical contact with components of the drive assembly.

Downstream from the slip rings 53, the power distribution system further includes electrical outlets 62 mounted to the platforms and configured to receive, in mating engagement, electrical plugs, for example multi-pronged connectors or USB-type connectors. As such, the electrical bridging assemblies 50 further include electrical wires (represented by the arrows showing direction of power flow) electrically interconnected between terminals of the slip rings (in this case, the inner ones 55) and the electrical outlets 62 on the platforms. The outlets 62 are of conventional designs and constructions.

Also, the power distribution system optionally comprises power electronic converters 65 respectively supported on the platforms 12, for example on the end wall portions 43, and electrically connected to the electrical bridges 50. Typically, the power electronic converters 65 are electrically interconnected between the slip rings 53 forming the second electrical terminals of the electrical bridges 50 and the outlets 62 which define terminal ends of the internal electrical distribution system of the storage system 10. The power electronic converters 65 are configured to transform the power into suitable formats, in regard to current-type (AC vs DC) and voltage, for the electrical devices stored on the platforms.

In use, electrical power is transferred from a source 3, usually external to the storage system 10, to the internal power distribution system for subsequent delivery to electrical loads situated on the platforms 12 which circulate within the storage space 20 around the prescribed path 14 depending on a selected one of the platforms to be retrieved and thus presented at the access opening 15.

Power from the source 3 is supplied to a set of distribution terminals 47 which are physically stationary, relative to the frame 18 of the storage system 10, and which encompass the prescribed path 14 of movement of the platforms. Thus, electrical power is made accessible for subsequent delivery adjacent all points along the prescribed path 14.

Power is transferred from the distribution terminals 47, which form a bus bar, to the platforms 12 by individual electrical bridges 50 provided therebetween. Each such bridge 50 is mechanically affixed to a rotatable carrier or carousel to which the platforms 12 are mechanically connected, and is supported for moving contact with the distribution terminals 47. Structurally speaking, each electrical bridge 50 extends outwardly from the platform carrier 37 and past the distribution terminals to locate a connection terminal therefor on outward side of the bus bar 47. As the bus bar is equidistant from the prescribed path 14 along the full length thereof, the connection terminal of the electrical bridge 50 is supported outwardly of the bus bar by the bridge's mounting location on the carrier into biased contact with the distribution terminal.

For each platform 12, power is transferred from the electrical bridge 50 to a conventional electrical outlet 62 to which electrical devices can be electrically connected. An optional power electric converter 65 may be provided between the electrical bridge and the outlet 62 to transform the power to a format different from the source 3, which is more suitable for the load on the platform. Typically, a voltage level of the power source 3 is much higher than voltage levels at which electrical devices operate, so the power electronic converters often step-down the voltage of the source 3 for the electrical devices.

As described hereinbefore, the present invention relates to a storage system with platforms for storing items, which are movable along a prescribed path. The storage system features an internal electrical power distribution system for supplying electrical power at each of the movable platforms to operate electrical devices thereon, such as refrigerators or chargers. The power distribution system comprises a set of distribution terminals or bus bar electrically connected to an external electrical power source, such as mains power, which extend along respective paths following the prescribed path of movement of the platforms. Further, the distribution system comprises a plurality of electrical bridging assemblies respectively bridging between the platforms and the distribution terminals. The electrical bridging assemblies are mechanically connected in fixed relation to the platforms and connected in movable electrical contact with the distribution terminals.

In other words, the present invention, as described hereinbefore, relates to a storage system utilizing a bus bar loop and slip rings connected directly to the shelves of a carousel. The bus bar system can run at the same electrical specifications of the carousel input and further power conversion can be done at the shelf level (additional transformer). For instance, a 480V carousel can have 480V on each shelf or 110V among multiple possible configurations. This invention can be used, but not limited to, for pre-heat molds before the point of use (time savings in set-up), keep items refrigerated, such as vaccines for pharmaceutical companies or groceries for a retail operator (especially for curb side pick-up programs) and recharging battery devices.

The scope of the claims should not be limited by the preferred embodiments set forth in the examples but should be given the broadest interpretation consistent with the specification as a whole.

The invention claimed is:

1. A storage system for storing items and electrical devices comprising:
    a frame arranged for resting on a support surface and defining a storage space and an access opening therefor;
    a plurality of platforms supported within the storage space for movement relative to the access opening and along a prescribed path, for receiving the items and the electrical devices to be stored and selectively presented at the access opening;
    a drive assembly configured to move the platforms along the prescribed path; and
    an electrical power distribution system for providing electrical power for the electrical devices on the plurality of platforms, wherein the electrical power distribution system comprises:
        a set of distribution terminals arranged for electrical connection to an electrical power source and extending along respective paths which follow the prescribed path of the platforms; and
        a plurality of electrical bridging assemblies connected for movement along the set of distribution terminals and respectively mechanically connected in fixed relation to the platforms, wherein the electrical bridging assemblies have respective first electrical terminals electrically connected to the distribution terminals and respective second electrical terminals located at or adjacent the platforms and configured to supply the electrical power from the electrical power source to the electrical devices on the plurality of platforms.

2. The storage system of claim 1 wherein the prescribed path of movement of the platforms is loop-shaped and the set of distribution terminals are loop-shaped so as to follow a loop-shaped path.

3. The storage system of claim 2 wherein the loop-shaped distribution terminals are disposed side-by-side so as to be respectively concentric to the prescribed path of movement of the platforms.

4. The storage system of claim 2 wherein the loop-shaped distribution terminals encompass a loop-shaped member defining the prescribed path of movement so as to be located outwardly thereof.

5. The storage system of claim 1 wherein the distribution terminals are electrically-conductive channels.

6. The storage system of claim 1 wherein the distribution terminals comprise electrical conductors which span the respective paths of the distribution terminals.

7. The storage system of claim 1 wherein, when the prescribed path of movement of the platforms is loop shaped, the distribution terminals are endless electrical conductors.

8. The storage system of claim 1 the platforms are respectively mounted to a carrier arranged to move along the prescribed path and the prescribed path has at least one turn, and wherein the electrical bridging assemblies comprise slip rings mounted to the carrier and forming the respective second terminals.

9. The storage system of claim 8 wherein the electrical power distribution system further includes electrical outlets mounted to the platforms and configured to receive electrical plugs, wherein the electrical outlets are electrically connected to the slip rings to receive electrical power therefrom.

10. The storage system of claim 8 wherein the electrical bridging assemblies comprise electromechanical assemblies forming the respective first terminals, wherein the electromechanical assemblies are configured for movable electrical contact with the set of distribution terminals and are electrically connected to the slip rings to transfer electrical power thereto.

11. The storage system of claim 1 wherein the electrical power distribution system comprises power electronic converters respectively supported on the platforms and electrically connected downstream from the electrical bridging assemblies.

* * * * *